United States Patent
Park et al.

(10) Patent No.: US 11,505,184 B2
(45) Date of Patent: Nov. 22, 2022

(54) APPARATUS FOR ASSISTANCE AVOIDANCE STEERING, SYSTEM HAVING THE SAME AND METHOD THEREOF

(71) Applicants: Hyundai Motor Company, Seoul (KR); Kia Motors Corporation, Seoul (KR)

(72) Inventors: Jae Il Park, Seoul (KR); Seung Ki Kim, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 159 days.

(21) Appl. No.: 16/826,923

(22) Filed: Mar. 23, 2020

(65) Prior Publication Data

US 2021/0146920 A1  May 20, 2021

(30) Foreign Application Priority Data

Nov. 18, 2019 (KR) .......................... 10-2019-0147683

(51) Int. Cl.
| | | |
|---|---|---|
| *B60W 30/09* | (2012.01) | |
| *B60W 10/20* | (2006.01) | |
| *B60W 10/18* | (2012.01) | |
| *B60W 40/08* | (2012.01) | |
| *B62D 15/02* | (2006.01) | |

(52) U.S. Cl.
CPC ............ *B60W 30/09* (2013.01); *B60W 10/18* (2013.01); *B60W 10/20* (2013.01); *B60W 40/08* (2013.01); *B62D 15/021* (2013.01); *B62D 15/0265* (2013.01); *B60W 2040/0818* (2013.01)

(58) Field of Classification Search
CPC ...... B60W 30/09; B60W 10/18; B60W 10/20; B60W 40/08; B60W 2040/0818; B62D 15/021; B62D 15/0265
See application file for complete search history.

(56) References Cited

U.S. PATENT DOCUMENTS

| | | | |
|---|---|---|---|
| 6,640,171 B2 | 10/2003 | Chen et al. | |
| 9,199,639 B2* | 12/2015 | Yamakado | .......... B60W 10/184 |
| 10,384,717 B2* | 8/2019 | Choi | ................. B60W 30/0953 |
| 10,549,781 B2* | 2/2020 | Park | ....................... G08G 1/166 |
| 2004/0193374 A1* | 9/2004 | Hac | ........................ G08G 1/167 |
| | | | 701/301 |
| 2009/0048739 A1* | 2/2009 | Midorikawa | ........... B60R 22/44 |
| | | | 701/45 |
| 2019/0184978 A1 | 6/2019 | Park et al. | |

FOREIGN PATENT DOCUMENTS

| | | | | |
|---|---|---|---|---|
| DE | 102017223295 A1 | * | 6/2019 | ........... B62D 5/0481 |
| GB | 2501167 A | * | 10/2013 | ......... B62D 15/0265 |
| JP | 2000177616 A | * | 6/2000 | |

(Continued)

*Primary Examiner* — Peter D Nolan
*Assistant Examiner* — Demetra R Smith-Stewart
(74) *Attorney, Agent, or Firm* — Slater Matsil, LLP

(57) ABSTRACT

An apparatus for assistance avoidance steering is provided. The apparatus includes a processor configured to perform avoidance steering control based on Rear Wheel Steering (RWS) control when a head-on collision risk is sensed, and a storage configured to store data and an algorithm runnable by the processor. The avoidance steering control is based on the algorithm.

20 Claims, 14 Drawing Sheets

(56) References Cited

FOREIGN PATENT DOCUMENTS

| JP | 2017081232 A | | 5/2017 | |
|----|--------------|---|--------|---|
| JP | 2020125057 A | * | 8/2020 | ........... B62D 5/0481 |
| KR | 20000015734 A | * | 3/2000 | |
| KR | 20160109285 A | | 9/2016 | |
| KR | 20190072205 A | | 6/2019 | |

* cited by examiner

<801>

<802>

APPARATUS FOR ASSISTANCE AVOIDANCE STEERING, SYSTEM HAVING THE SAME AND METHOD THEREOF

CROSS-REFERENCE TO RELATED APPLICATIONS

This application claims priority to Korean Patent Application No. 10-2019-0147683, filed in the Korean Intellectual Property Office on Nov. 18, 2019, which application is hereby incorporated herein by reference.

TECHNICAL FIELD

The present disclosure relates to an apparatus (avoidance steering assistance apparatus) for assistance avoidance steering, a system having the same, and a method thereof.

BACKGROUND

In general, a chassis integrated control system is to control an individual system such as Electronic Control Suspension (ECS), Motor Driven Power Steering (MDPS) System, Electronic Stability Control (ESC), or All Wheel Drive (AWD). In particular, the aim of collision avoidance control, which is avoidance control that matches each control of Motor Driven Power Steering (MDPS), Electronic Stability Control (ESC), and All Wheel Drive (AWD) with Electronic Control Suspension (ECS) when a head-on collision risk is determined, is to resolve the collision risk against the front vehicle (or front object).

In particular, when the avoidance control and the stabilization control are performed, counter-steering determination is performed based on the steering angle and the yaw rate. When the avoidance steering control is performed in terms of the yaw rate of the vehicle, the transverse movement distance is not increased actually, so the stability of the vehicle may not be ensured.

SUMMARY

The present disclosure can solve the above-mentioned problems occurring in the prior art while advantages achieved by the prior art are maintained intact.

The present disclosure relates to an apparatus (avoidance steering assistance apparatus) for assistance avoidance steering, a system having the same, and a method thereof. Particular embodiments relate to a technology for determining a head-on collision risk and performing avoidance steering control.

An embodiment of the present disclosure provides an avoidance steering assistance apparatus, capable of improving the performance of the avoidance of a head-on collision of the vehicle and improving the stability of the vehicle after avoidance, by ensuring the maximum transverse distance through Rear Wheel Steering (RWS) when a driver performs avoidance steering to avoid the head-on collision in the situation that a possible head-on collision is sensed, a system having the same, and a method thereof.

Another embodiment of the present disclosure provides an avoidance steering assistance apparatus, capable of changing an RWS control amount depending on the size of the steering angle by a driver, a system having the same, and a method thereof.

Another embodiment of the present disclosure provides an avoidance steering assistance apparatus, capable of determining the stable stage of a vehicle by estimating the transverse slip angle of a rear wheel tire and varying a Rear Wheel Steering (RWS) control amount in a stable control mode, a system having the same, and a method thereof.

The technical problems to be solved by the present disclosure are not limited to the aforementioned problems, and any other technical problems not mentioned herein will be clearly understood from the following description by those skilled in the art to which the present disclosure pertains.

According to an embodiment of the present disclosure, an apparatus for assistance avoidance steering may include a processor to perform avoidance steering control based on Rear Wheel Steering (RWS) control when a head-on collision risk is sensed, and a storage to store data and an algorithm run by the processor.

According to an embodiment, the processor may calculate an RWS control amount for the RWS control to ensure a transverse distance in the avoidance steering control.

According to an embodiment, the processor may calculate the RWS control amount based on a vehicle speed, a driver steering angle, and a steering angular velocity.

According to an embodiment, the processor may generate a transverse distance gain by moving a rotation center to a rear portion from the center of gravity of a vehicle, when the vehicle is turned for the avoidance steering control.

According to an embodiment, the processor may determine a target transverse distance in the avoidance steering control based on a relative distance to a front vehicle and a relative speed to the front vehicle, and determine a movement distance of the rotation center based on the target transverse distance.

According to an embodiment, the processor may vary the RWS control amount depending on a driver steering angle.

According to an embodiment, the processor may increase the RWS control amount when the driver steering angle is smaller than a preset reference value, and decrease the RWS control amount when the driver steering angle is equal to or greater than the preset reference value.

According to an embodiment, the processor may process counter-phase control at an initial stage of turning of the vehicle, and in-phase control during the turning of the vehicle, in the RWS control to increase transverse distance.

According to an embodiment, the processor may perform automatic steering or braking control when steering control by the driver is absent.

According to an embodiment, the processor may determine a stabilization state of the vehicle by estimating a transverse slip angle of a rear wheel of the vehicle.

According to an embodiment, the processor may enter a stabilization control mode when the estimated transverse slip angle of the vehicle exceeds a preset threshold value.

According to an embodiment, the processor may vary the RWS control amount in the stabilization control mode.

According to an embodiment of the present disclosure, a vehicle system may include an avoidance steering assistance apparatus to perform avoidance steering control based on Rear Wheel Steering (RWS) control when a head-on collision risk is sensed, and a rear wheel steering driving device controlled by the avoidance steering assistance apparatus to drive RWS of a vehicle.

According to an embodiment, the vehicle system may further include a vehicle exterior information sensing device to obtain information on an obstacle outside the vehicle, a vehicle interior information sensing device to obtain internal information of the vehicle, and an external situation recognizing device to recognize a determination result of a collision risk outside the vehicle.

According to an embodiment, the avoidance steering assistance apparatus may calculate an RWS control amount for the RWS control to ensure a transverse distance in the avoidance steering control.

According to an embodiment, the avoidance steering assistance apparatus may generate a transverse distance gain by moving a rotation center to a rear portion from the center of gravity of a vehicle, when the vehicle is turned for the avoidance steering control, and determine a target transverse distance in the avoidance steering control based on a relative distance to a front vehicle and a relative speed to the front vehicle, and determine a movement distance of the rotation center based on the target transverse distance.

According to another aspect of the present disclosure, a method for assistance avoidance steering may include sensing a head-on collision risk, calculating an RWS control amount to perform avoidance steering control for the head-on collision risk, and performing the avoidance steering control based on the RWS control amount.

According to an embodiment, the calculating of the RWS control amount may include calculating the RWS control amount based on a vehicle speed, a driver steering angle, and a steering angular velocity.

According to an embodiment, the calculating of the RWS control amount may include varying the RWS control amount depending on a steering angle of a driver.

According to an embodiment, the calculating of the RWS control amount may include determining a stabilization state of the vehicle by estimating a transverse slip angle of a rear wheel of the vehicle, and varying the RWS control amount depending on the stabilization state of the vehicle.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION OF ILLUSTRATIVE EMBODIMENTS

Figure 1:
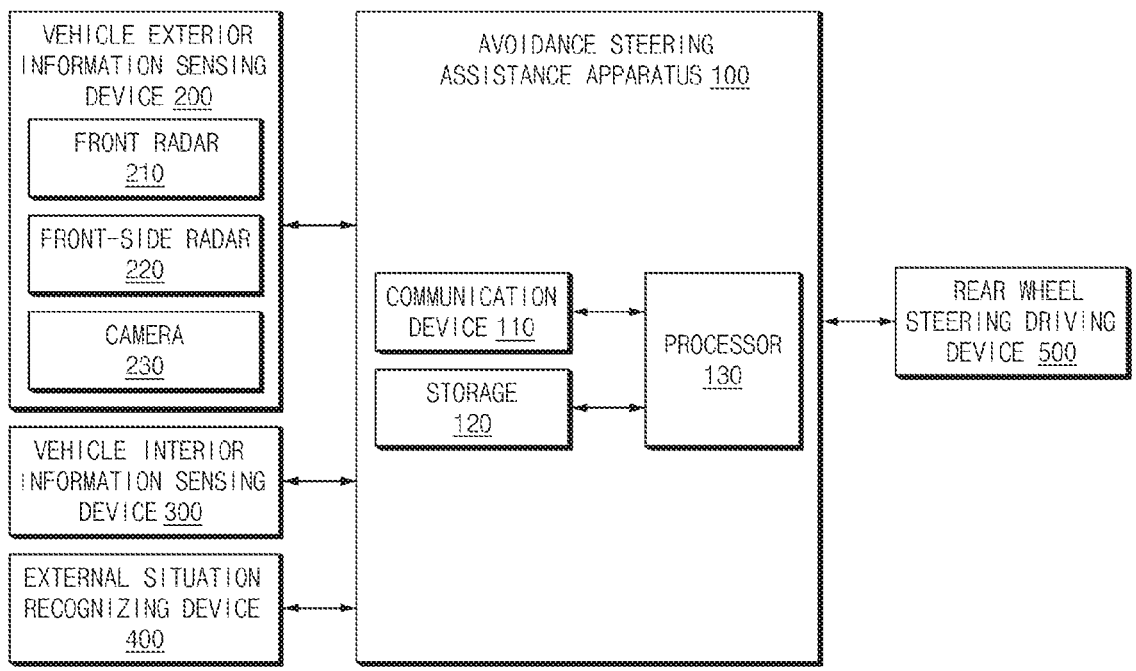
FIG. 1 is a block diagram illustrating the configuration of a vehicle system including an avoidance steering assistance apparatus, according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiments according to the present disclosure, terms such as first, second, "A", "B", (a), (b), and the like may be used. These terms are merely intended to distinguish one component from another component, and the terms do not limit the nature, sequence or order of the constituent components. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described with reference to FIGS. 1 to 13.

Figure 2:
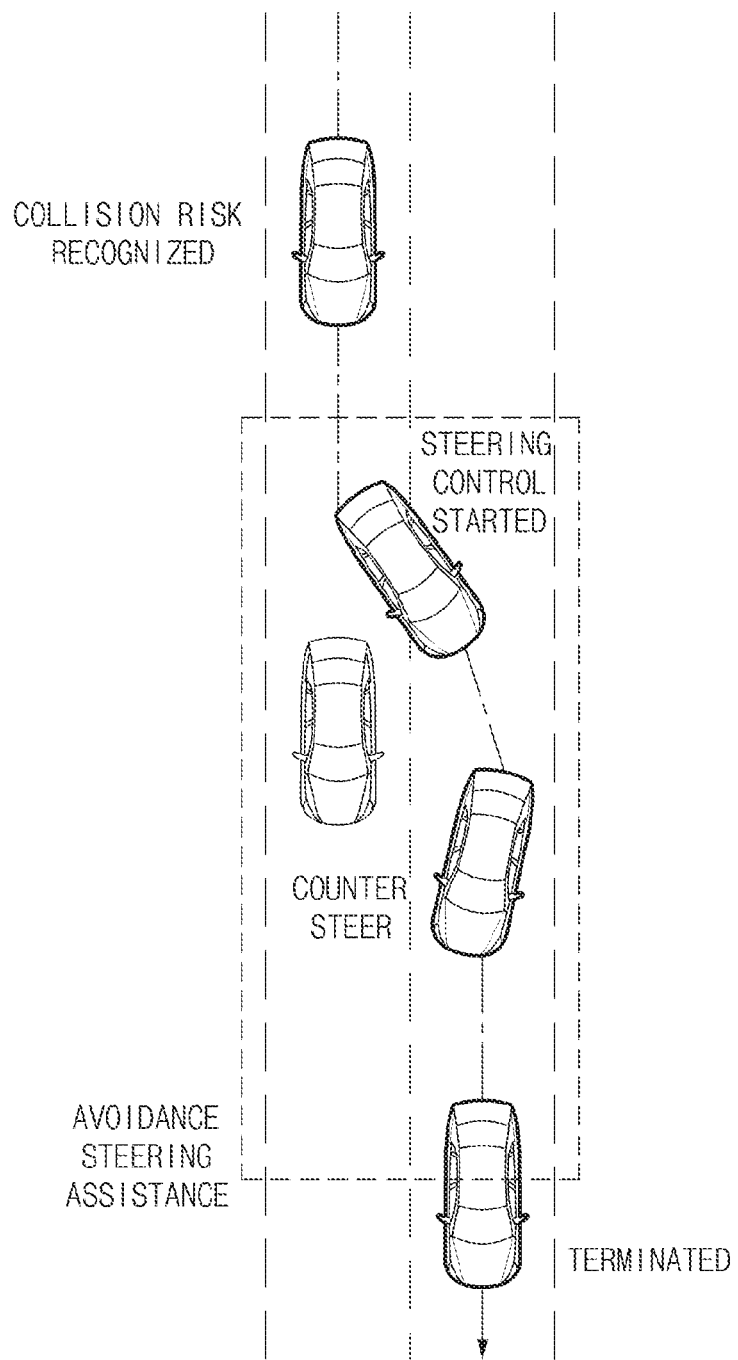
FIG. 2 is a view illustrating a screen of an avoidance steering situation, according to an embodiment of the present disclosure.

FIG. 1 is a block diagram illustrating the configuration of a vehicle system including an avoidance steering assistance apparatus, according to an embodiment of the present disclosure, and FIG. 2 is a view illustrating the screen of an avoidance steering situation, according to an embodiment of the present disclosure.

Referring to FIG. 1, according to an embodiment of the present disclosure, the vehicle system may include the avoidance steering assistance apparatus 100, a vehicle exterior information sensing device 200, a vehicle interior information sensing device 300, an external situation recognizing device 400, and a rear wheel steering driving device 500.

Referring to FIG. 2, when the vehicle system recognizes a head-on collision risk, the vehicle performs the vehicle avoidance steering control based on Rear Wheel Steering (RWS) by avoiding the front vehicle, completes the avoidance control, and drives in a stable section. According to an embodiment of the present disclosure, the avoidance steering assistance apparatus 100 may enlarge the transverse distance based on the RWS and increase or decrease an RWS control amount depending on the steering of the driver or the stable state of the vehicle during the avoidance steering control.

According to an embodiment of the present disclosure, the avoidance steering assistance apparatus 100 may be implemented inside a vehicle. In this case, the avoidance steering assistance apparatus 100 may be implemented integrally with internal control units of the vehicle. Alternatively, the avoidance steering assistance apparatus may be implemented separately from the internal control units of the vehicle and may be connected with the internal control units of the vehicle through an additional connection unit.

The avoidance steering assistance apparatus 100 may perform a control operation such that a driver ensures a maximum transverse distance when performing steering control to avoid collision with a surrounding object.

The avoidance steering assistance apparatus 100 may include a communication device 110, a storage 120, and a processor 130.

The communication device 110, which is a hardware device implemented with various electronic circuits to transmit or receive a signal through wireless or wired connection, may make V2I communication through an in-vehicle network communication technology or wireless Internet access or short range communication technology with an external server of a vehicle, an infrastructure, and other vehicles. In this case, the vehicle network communication technology may include a controller area network (CAN) communication technology, a local interconnect network (LIN) communication technology, or a Flex-Ray communication technology, and in-vehicle communication may be performed through the above communication technology. The wireless Internet technology may include a wireless LAN (WLAN), a wireless broadband (Wibro), a Wi-Fi, or a World Interoperability for Microwave Access (WiMAX). The short range communication technology may include Bluetooth, ZigBee, ultra wideband (UWB), radio frequency identification (RFID), or infrared data association (IrDA).

For example, the communication device 110 may receive a signal from the vehicle exterior information sensing device 200, the vehicle interior information sensing device 300, and the external situation recognizing device 400 through a vehicle network.

The storage 120 may store sensing results of the vehicle exterior information sensing device 200 and the vehicle interior information sensing device 300, information from the external situation recognizing device 400, and data and/or an algorithm necessary for the processor 130 to operate.

The storage 120 may be implemented with at least one storage medium of a memory in a flash memory type, a hard disk type, a micro type, the type of a card (e.g., a Security Digital (SD) card or an eXtreme digital card), a Random Access Memory (RAM), a Static RAM (SRAM), a Read Only Memory (ROM), a Programmable ROM (PROM), an Electrically Erasable and Programmable ROM (EEPROM), a magnetic RAM (MRAM), a magnetic disk-type memory, and/or an optical disk-type memory.

A display may include an input device to receive a control command from a user and an output device to output the operation state and the operation result of the avoidance steering assistance apparatus 100. In this case, the input device may include a key button, and may include a mouse, a joystick, a jog shuttle, a stylus pen, or the like. In addition, the input device may include a soft key implemented on a display. The output device may include a display and may include a voice output device such as a speaker. In the case that a touch sensor, such as a touch film, a touch sheet, or a touch pad is included in the display, the display may operate as a touch screen, and the input device and the output device may be implemented in the integral form. According to embodiments of the present disclosure, the output device may output platooning information such as sensor failure information, leading vehicle information, vehicle platoon information, a platooning speed, a destination, a waypoint, or a route.

In this case, the display may include at least one of a liquid crystal display (LCD), a thin film transistor-liquid crystal display (TFT LCD), an organic light-emitting diode (OLED), a flexible display, a field emission display (FED), or three dimensional display (3D display).

The processor 130 may be electrically connected with the communication device 110, the storage 120, or the display, may electrically control each component, and may be an electric circuit that executes software commands.

The processor 130 may process signals transmitted/received between components of the avoidance steering assistance apparatus 100. The processor 130 may be, for example, an electronic control unit (ECU), a micro controller unit (MCU), or another lower-level controller.

When the head-on collision risk is detected, the processor 130 may perform the avoidance steering control based on rear wheel steering (RWS) control.

The processor 130 may calculate an RWS control amount for the RWS control in the avoidance steering control. In this case, the processor 130 may calculate the RWS control amount to ensure a transverse distance.

The processor 130 may calculate the RWS control amount based on a vehicle speed, a driver steering angle, and a steering angular velocity. In addition, the processor 130 may calculate the RWS control amount using a vehicle weight, a yaw rate, a front wheel steering (the steering angle of the driver; driver steering angle), or a vehicle body transverse slip angle, as well as the vehicle speed, the driver steering angle, and the steering angular velocity.

When turning the vehicle for the avoidance steering control, the processor 130 may generate a transverse distance gain by moving the rotation center to the rear portion from the center of gravity of the vehicle, may determine a target transverse distance in the avoidance steering control based on the relative distance to a front vehicle and the relative speed to the front vehicle, and may determine the movement distance of the rotation center based on the target transverse distance. The processor 130 may calculate the RWS control amount using the movement distance of the rotation center.

The processor 130 may vary the RWS control amount depending on the steering angle of the driver. In other words, the processor 130 may increase the RWS control amount when the steering angle of the driver is smaller than a preset reference value, and may decrease the RWS control amount when the steering angle of the driver is equal to or greater than the preset reference value, thereby minimizing the sense of difference.

The processor 130 may perform, in the RWS control, counter-phase control at the initial stage of the turning of the vehicle, and in-phase control during the turning of the vehicle. In this case, the turning responsiveness may be increased in the counter-phase control. In addition, the in-phase control may be performed during the turning to increase the transverse distance.

The processor 130 may perform automatic steering or braking control when steering control by the driver is absent.

The processor 130 may determine the stabilization state of the vehicle by estimating the transverse slip angle of the rear wheel of the vehicle, and may additionally vary the RWS control amount depending on the determination result of the stabilization state of the vehicle. In other words, the processor 130 may determine that the vehicle is in an unstable state when the transverse slip angle of the vehicle exceeds a preset threshold value, and may enter a stabilization control mode.

The processor 130 may vary the RWS control amount in the stabilization control mode. In particular, the RWS control amount may be increased for the stabilization of the vehicle.

The vehicle exterior information sensing device 200 may include at least one sensor to detect an obstacle, such as a front vehicle, positioned around the vehicle and may obtain information on the distance to the obstacle, the relative speed to the obstacle, or the type (e.g., a vehicle, a pedestrian, a bicycle or a motorcycle) of the obstacle.

To this end, the vehicle exterior information sensing device 200 may include a front radar 210, a front-side radar 220, and a camera 230, and may further include an ultrasonic sensor, a laser scanner, a corner radar, Lidar, and/or an acceleration sensor.

The vehicle interior information sensing device 300 may include at least one sensor to detect a vehicle driving state, and may include a yaw rate sensor, a torque measuring sensor, a wheel speed sensor, and/or a steering angle sensor.

The external situation recognizing device 400 recognizes the external situation, determines the risk of collision, and provides the determination result to the avoidance steering assistance apparatus 100. For example, the external situation recognizing device 400 may include Advanced Driver Assistance Systems (ADAS).

The rear wheel steering driving device 500 drives the rear wheel steering according to the RWS control amount calculated by the avoidance steering assistance apparatus 100.

Figure 3A:
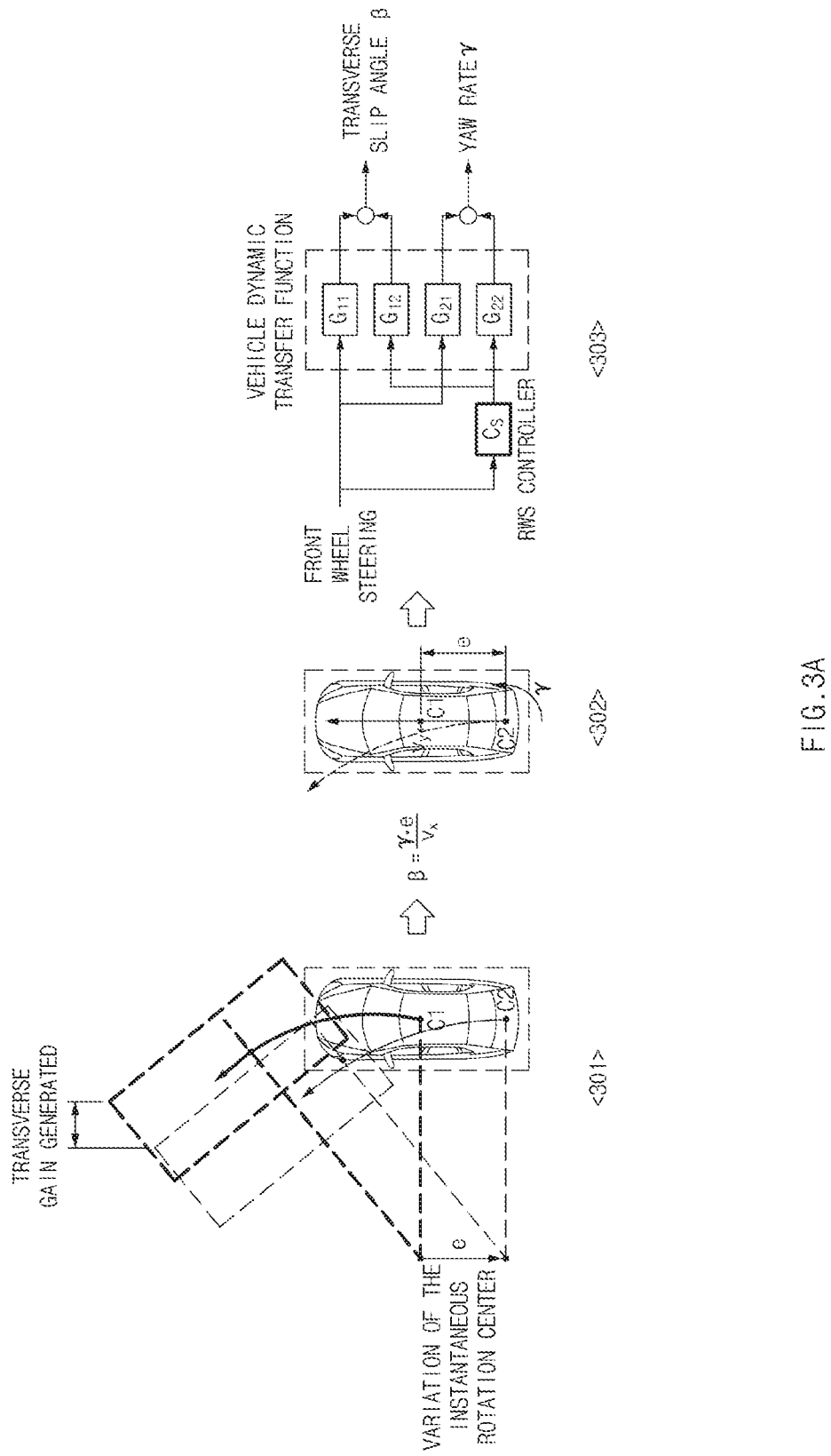
FIG. 3A is a view illustrating a method of applying a transverse distance gain during avoidance steering, according to an embodiment of the present disclosure.
Figure 3B:
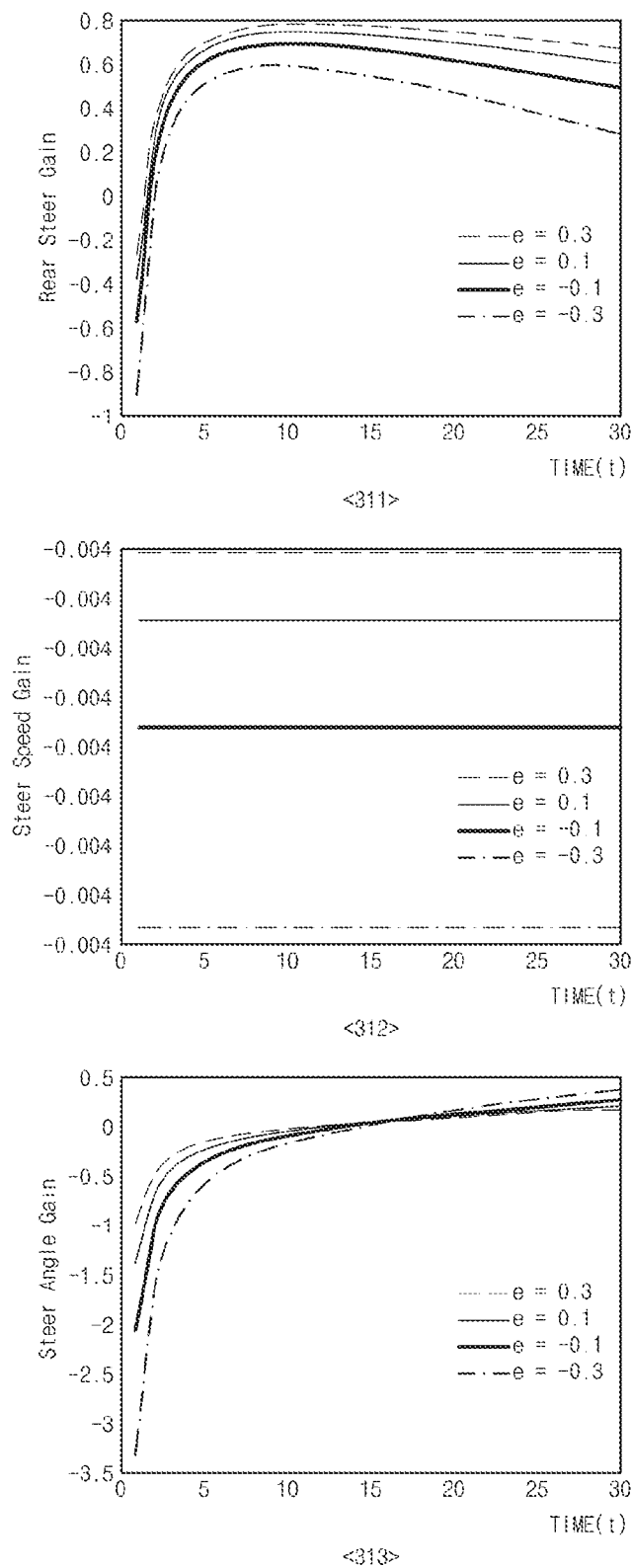
FIG. 3B is a view illustrating a process of deriving an RWS control amount corresponding to a vehicle speed, a driver steering angle, and a steering angular velocity during avoidance steering, according to an embodiment of the present disclosure.

FIG. 3A is a view illustrating a method of applying a transverse distance gain during avoidance steering, according to an embodiment of the present disclosure. FIG. 3B is a view illustrating a process of deriving an RWS control amount corresponding to a vehicle speed, a driver steering angle, and a steering angular velocity during avoidance steering, according to an embodiment of the present disclosure.

Referring to reference numeral 301 of FIG. 3A, the avoidance steering assistance apparatus 100 may generate a transverse distance gain by moving the instantaneous rotation center C1 to the rear portion C2 of the center of gravity of the vehicle when turning the vehicle for avoidance steering control. In this case, referring to reference numeral 302, the avoidance steering assistance apparatus 100 may calculate a transverse slip angle (β) using a variation (e) of the instantaneous rotation center, a yaw rate (γ), and a vehicle speed ($V_x$).

Referring to reference numeral 303, the RWS controller may generate a rear wheel steering command due to the variation of front wheel steering (steering by the driver) and the rear wheel steering command may converge to zero when the vehicle straightly travels.

As in Equation 1, the RWS control amount ($\delta_r$) may be calculated by computing a transfer function ($C_s$) with respect to the front wheel steer value ($\delta_f$).

$$\delta_r = C_s \cdot \delta_f \qquad \text{Equation 1}$$

In addition, the transfer function ($C_s$) is expressed as in the following Equation 2.

The transverse slip angle and the yaw rate may be calculated from the vehicle dynamic model as in reference numeral 303 of FIG. 3A, and may be derived as in Equation 2.

$$\begin{aligned}
\beta &= G_{11} \cdot \delta_f + G_{12} \cdot \delta_r \to \beta = G_{11} \cdot \delta_f + G_{12} \cdot C_s \cdot \delta_f \\
\gamma &= G_{21} \cdot \delta_f + G_{22} \cdot \delta_r \to \gamma = G_{21} \cdot \delta_f + G_{22} \cdot C_s \cdot \delta_f \\
\to \beta &= G_{11} \cdot \delta_f + G_{12} \cdot C_s \cdot \delta_f = \frac{\gamma \cdot e}{v_x} = \frac{(G_{21} \cdot \delta_f + G_{22} \cdot C_s \cdot \delta_f) \cdot e}{v_x} \\
\therefore C_s &= \frac{v_x \cdot G_{11} - e \cdot G_{21}}{e \cdot G_{22} - v_x \cdot G_{12}}
\end{aligned} \qquad \text{Equation 2}$$

In this case, '$G_{11}$', '$G_{12}$', '$G_{13}$', '$G_{14}$' denote dynamic functions, $V_x$ denotes a vehicle speed, 'e' denotes the variation of the instantaneous rotation center, and $\delta_f$ denotes the "front when steering value".

In Equation 2, the dynamic functions $G_{11}$, $G_{12}$, $G_{13}$, and $G_{14}$ are expressed as in the following Equation 3.

Equation 3

$$G_{11} = \frac{(C_f \cdot I_z \cdot v_x) \cdot s + \{C_f \cdot C_r \cdot l_r \cdot (l_f + l_r) - C_f \cdot l_f \cdot m_v \cdot v_x^2\}}{(I_z \cdot m_v \cdot v_x^2) \cdot s^2 + \{(C_f \cdot l_f^2 + C_r \cdot l_r^2) \cdot m_v \cdot v_x + (C_f + C_r) \cdot I_z \cdot v_x\} \cdot s + \{C_f \cdot C_r \cdot (l_f + l_r)^2 + m_v \cdot (-C_f \cdot l_f + C_r \cdot l_r) \cdot v_x^2\}}$$

$$G_{12} = \frac{(C_r \cdot I_z \cdot v_x) \cdot s + \{C_f \cdot C_r \cdot l_f \cdot (l_f + l_r) + C_r \cdot l_r \cdot m_v \cdot v_x^2\}}{(I_z \cdot m_v \cdot v_x^2) \cdot s^2 + \{(C_f \cdot l_f^2 + C_r \cdot l_r^2) \cdot m_v \cdot v_x + (C_f + C_r) \cdot I_z \cdot v_x\} \cdot s + \{C_f \cdot C_r \cdot (l_f + l_r)^2 + m_v \cdot (-C_f \cdot l_f + C_r \cdot l_r) \cdot v_x^2\}}$$

$$G_{21} = \frac{(C_f \cdot l_f \cdot m_v \cdot v_x^2) \cdot s + C_f \cdot C_r \cdot v_x \cdot (l_f + l_r)}{(I_z \cdot m_v \cdot v_x^2) \cdot s^2 + v_x \cdot \{(C_f \cdot l_f^2 + C_r \cdot l_r^2) \cdot m_v \cdot v_x + (C_f + C_r) \cdot I_z\} \cdot s + \{C_f \cdot C_r \cdot (l_f + l_r)^2 + m_v \cdot (-C_f \cdot l_f + C_r \cdot l_r) \cdot v_x^2\}}$$

$$G_{22} = \frac{(-C_r \cdot l_r \cdot m_v \cdot v_x^2) \cdot s - C_f \cdot C_r \cdot v_x \cdot (l_f + l_r)}{(I_z \cdot m_v \cdot v_x^2) \cdot s^2 + v_x \cdot \{(C_f \cdot l_f^2 + C_r \cdot l_r^2) \cdot m_v \cdot v_x + (C_f + C_r) \cdot I_z\} \cdot s + \{C_f \cdot C_r \cdot (l_f + l_r)^2 + m_v \cdot (-C_f \cdot l_f + C_r \cdot l_r) \cdot v_x^2\}}$$

When the dynamic functions $G_{11}$, $G_{12}$, $G_{13}$, and $G_{14}$) are substituted through Equation 2 and Equation 3, the transfer function may be defined as in the following Equation 4.

Equation 4

$$C_s = \frac{C_f \cdot (m_v \cdot l_f \cdot e - I_z) \cdot s + C_f \cdot \left(m_v \cdot l_f \cdot v_x + \frac{l \cdot C_r \cdot (e - l_r)}{v_x}\right)}{C_r \cdot (m_v \cdot l_r \cdot e + I_z) \cdot s + C_r \cdot \left(m_v \cdot l_r \cdot v_x + \frac{l \cdot C_f \cdot (e + l_f)}{v_x}\right)}$$

In Equations 3 and 4, '$m_v$' denotes the vehicle weight, '$C_S$' denotes the transfer function, 'l' denotes the vehicle wheel base (vehicle resources), '$I_z$' denotes the moment of inertia, which is applied in a yaw direction, of the vehicle, '$l_r$' denotes the distance from a point 'CG' to the rear wheel of the vehicle, $l_f+l_r=l$, '$C_f$' denotes the cornering force of the front wheel, '$C_r$' denotes the cornering force of the rear wheel, and 's' denotes the order used in the transfer function.

The transfer function ($C_s$) is developed in terms of a frequency domain to be the form as in the following Equation 5.

Equation 5

$$C_s = \cfrac{\cfrac{c}{C_f \cdot (m_v \cdot l_f \cdot e - I_z) \cdot s + C_f \cdot \left(m_v \cdot l_f \cdot v_x + \cfrac{l \cdot C_r \cdot (e - l_r)}{v_x}\right)}}{\underbrace{C_r \cdot (m_v \cdot l_r \cdot e + I_z)}_{a} \cdot s + \underbrace{C_r \cdot \left(m_v \cdot l_r \cdot v_x + \cfrac{l \cdot C_f \cdot (e + l_f)}{v_x}\right)}_{b}} \rightarrow \delta_r = \frac{c \cdot s + d}{a \cdot s + b} \cdot \delta_f$$

Thereafter, the transfer function 'C_s' based on the frequency domain is developed in terms of the time domain to be the form as in Equation 6.

$$a \cdot \dot{\delta}_r + b \cdot \delta_r = c \cdot \dot{\delta}_f + d \cdot \delta_f \quad \text{Equation 6}$$

$$\rightarrow \dot{\delta}_r = -\frac{b}{a} \cdot \delta_r + \frac{c}{a} \cdot \dot{\delta}_f + \frac{d}{a} \cdot \delta_f$$

When discretizing Equation 6, Equation 6 is represented as in the following Equation 7.

$$\delta_r^{k+1} = \left(1 - \frac{dt \cdot b}{a}\right) \cdot \delta_r^k + \frac{dt \cdot c}{a} \cdot \dot{\delta}_f + \frac{dt \cdot d}{a} \cdot \delta_f \quad \text{Equation 7}$$

In Equation 7, $$\left(1 - \frac{dt \cdot b}{a}\right) \cdot \delta_r^k$$

makes a control amount, which is in the normal state, to converge to zero such that the control logic is stabilized. Reference numeral 311 of FIG. 3B indicates the variation of a steer gain (rear steer gain) of a rear wheel based on a variation (e) of the rotation center.

$$\frac{dt \cdot c}{a} \cdot \dot{\delta}_f$$

is a steering angular velocity related variable, and helps turning responsiveness improve by calculating the rear wheel steering control amount inversely proportional to the steering angular velocity. Reference numeral 312 of FIG. 3B indicates the gain (a steer speed gain) of the steering angular velocity based on a variation (e) of the rotation center.

$$\frac{dt \cdot d}{a} \cdot \delta_f$$

is a variable related to a steering angle and is used to calculate the control amount of the rear wheel steer based on the steering angle.

$$\frac{dt \cdot d}{a} \cdot \delta_f$$

allows counter-phase control at a lower speed and allows in-phase control at a higher speed. Reference numeral 313 of FIG. 3B indicates a steer angle gain based on the variation € of the rotation center.

Figure 4:
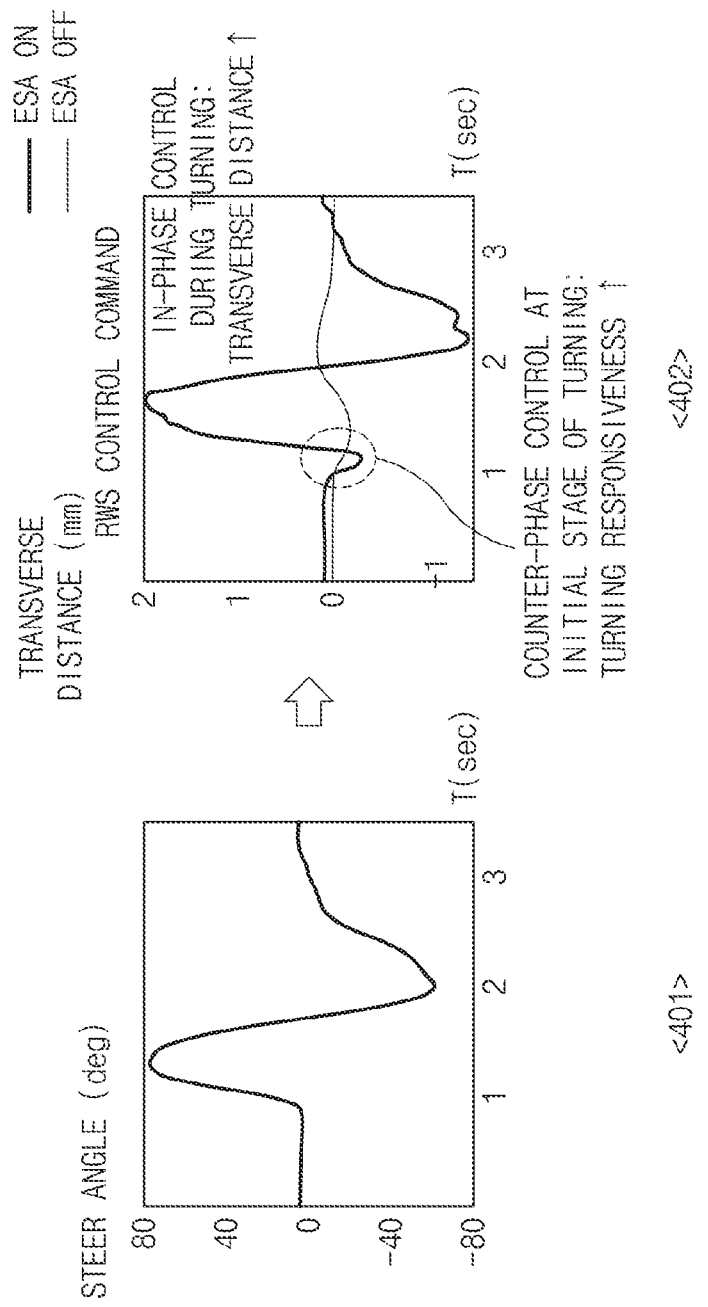
FIG. 4 is a graph illustrating RWS control during avoidance steering, according to an embodiment of the present disclosure.

FIG. 4 is a graph illustrating an RWS control during avoidance steering, according to an embodiment of the present disclosure.

Referring to reference numeral 401 of FIG. 4, the steering angle is increased at the time point at which steering is started, and the steering angle is reversely decreased after a specific time is elapsed.

Referring to reference numeral 402, when the ESA OFF (conventional) is applied, counter-phase control is finely performed in an 80 Kph section. When the ESA ON (present disclosure) is applied, the turning responsiveness may be improved by performing the counter-phase control at the initial stage of the turning, and the transverse distance gain may be obtained by performing in-phase control during turning.

Figure 5:
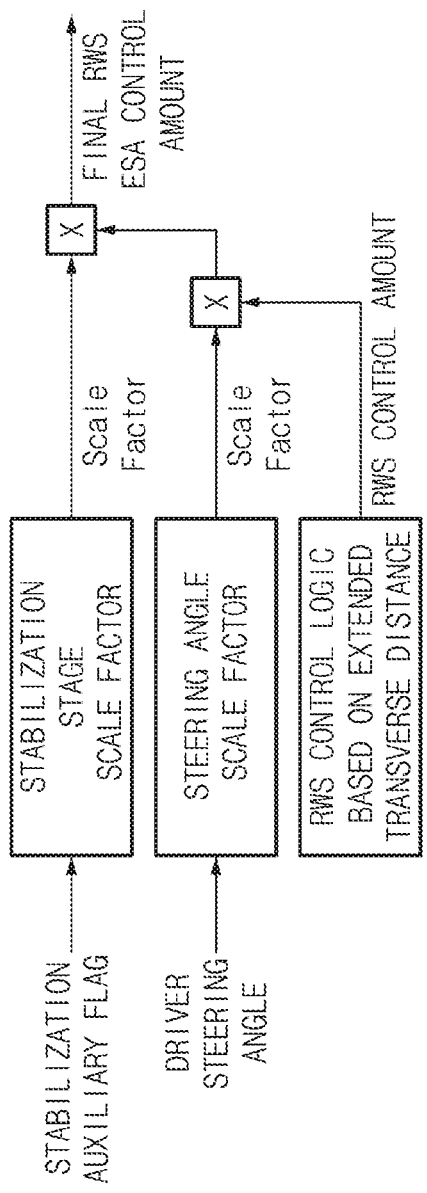
FIG. 5 is a view illustrating a final RWS control logic structure based on the size of a driver steering angle and a stabilization stage, according to an embodiment of the present disclosure.

FIG. 5 is a diagram illustrating a final RWS control logic structure based on the size of a driver steering angle and a stabilization step, according to an embodiment of the present disclosure.

Referring to FIG. 5, the RWS control amount based on the extended transverse distance may be calculated through RWS control logic based on the extended transverse distance, may be increased or decreased by applying the steering angle-based scale factor depending on the steering angle of the driver, may be increased or decreased by applying a variable scale factor, which is based on the stabilization stage, to the changed RWS control amount, such that the final RWS control amount is calculated.

Figure 6:
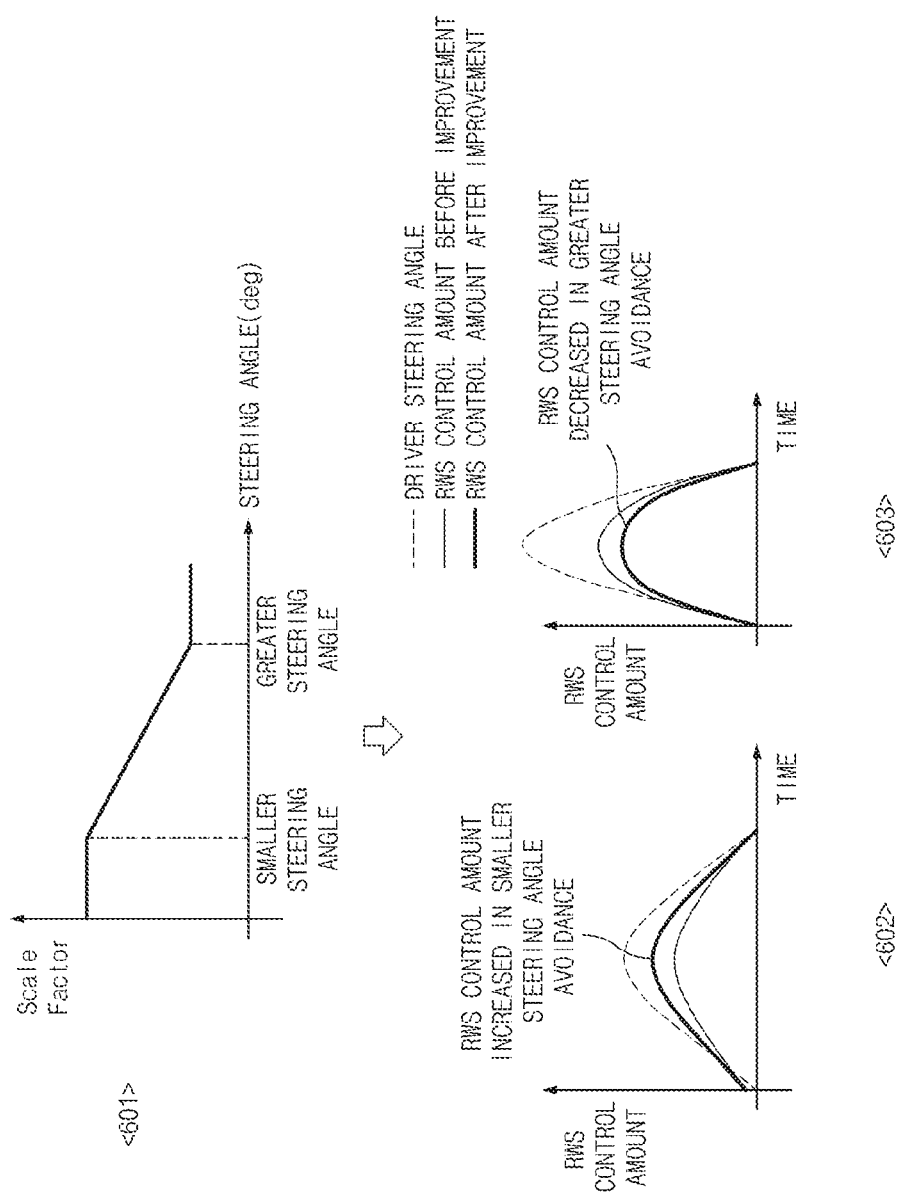
FIG. 6 is a view illustrating a change in the RWS control amount according to an embodiment of the present disclosure.

FIG. 6 is a view illustrating a change in the RWS control amount, according to an embodiment of the present disclosure.

Referring to reference numerals 601 and 602 of FIG. 6, when the steering angle of the driver is small, the RWS control amount may be increased, and when the steering angle of the driver is greater, as in reference numeral 603, the RWS control amount may be reduced to minimize the sense of the difference.

Figure 7:
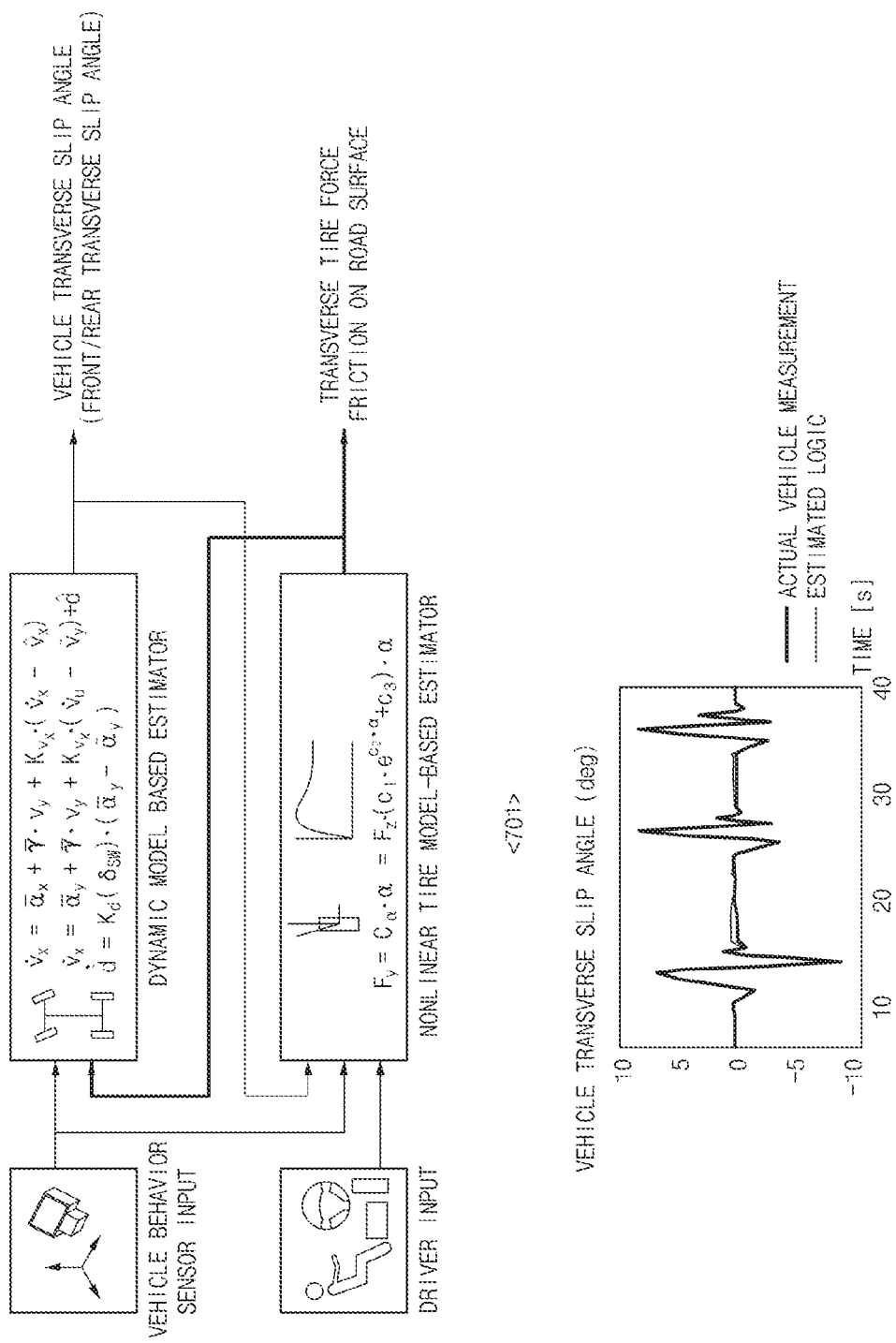
FIG. 7 is a view illustrating a procedure for determining stability, according to an embodiment of the present disclosure.

FIG. 7 is a view illustrating a procedure of determining stability, according to an embodiment of the present disclosure.

The avoidance steering assistance apparatus 100 may enter the stabilization control mode when the vehicle stability control is required by estimating the vehicle front/rear side slip angle.

Reference numeral 701 of FIG. 7 illustrates the logic structure to determine the stability, and the vehicle front/rear transverse slip angle is calculated in a kinematic model-based estimator using a vehicle behavior sensor input value. In addition, the tire transverse force road friction may be calculated by a nonlinear tire model-based estimator based on the vehicle behavior sensor input and the steering input by the driver. In this case, the nonlinear tire model-based estimator is a low-dimensional nonlinear tire mathematics model computable in real time.

Reference numeral 702 is a graph illustrating an actual vehicle transverse slip angle (front wheel/rear wheel transverse slip angle) and an estimated vehicle transverse slip angle. In this case, the estimated vehicle front wheel/rear wheel transverse slip angle is approximately similar to the actual vehicle front wheel/rear wheel transverse slip angle.

Figure 8:
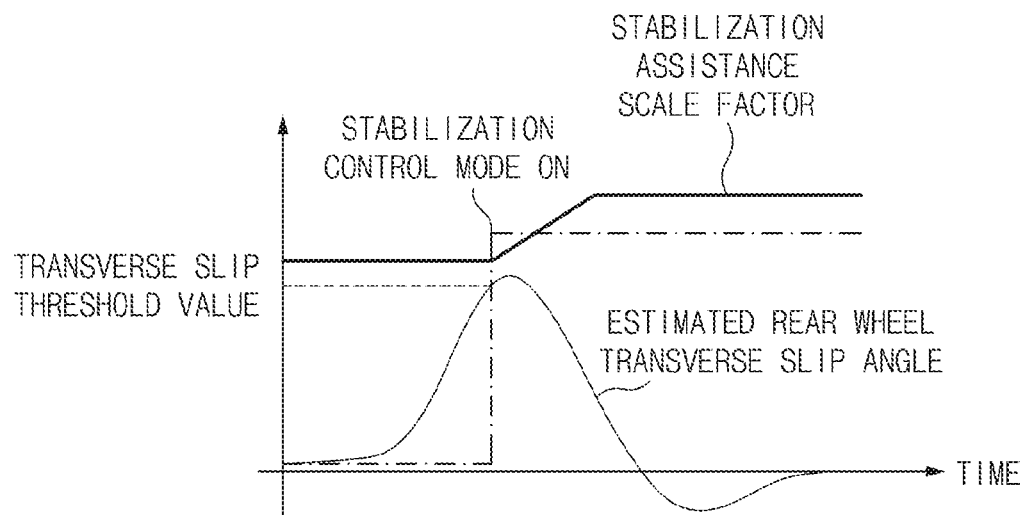
FIG. 8 is a graph illustrating a change in the RWS control amount in a stabilization control mode, according to an embodiment of the present disclosure.
Figure 8:
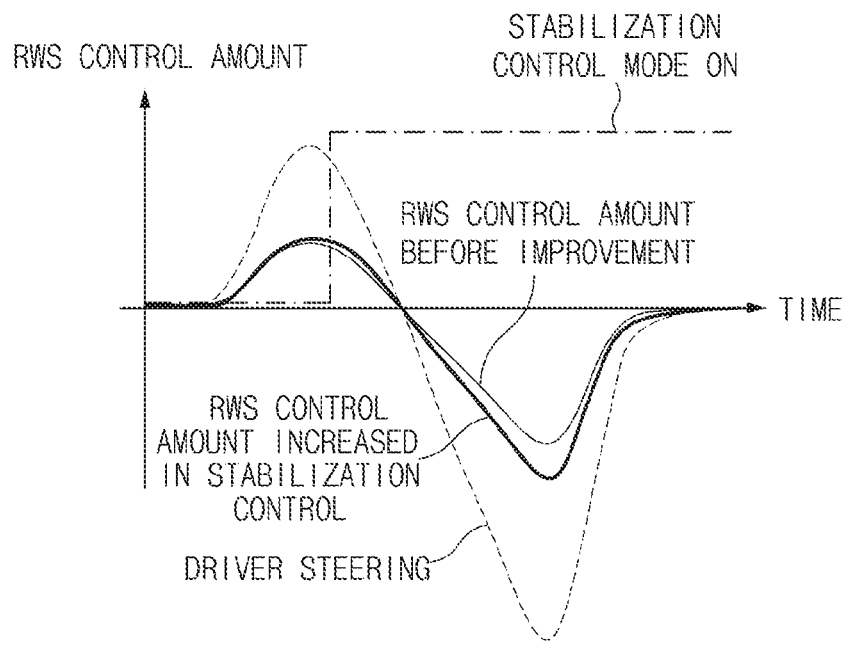

FIG. 8 is a view illustrating a change in the RWS control amount in a stabilization control mode according to an embodiment of the present disclosure.

Referring to reference numeral 801 of FIG. 8, when the estimated rear wheel transverse slip angle becomes a preset transverse slip threshold value, the stabilization control mode is turned on, so a stabilization assist scale factor is applied. Accordingly, the RWS control amount may be increased or decreased.

Referring to reference numeral 802, it may be understood that the RWS control amount is increased after the stabilization control mode is turned on.

Figure 9:
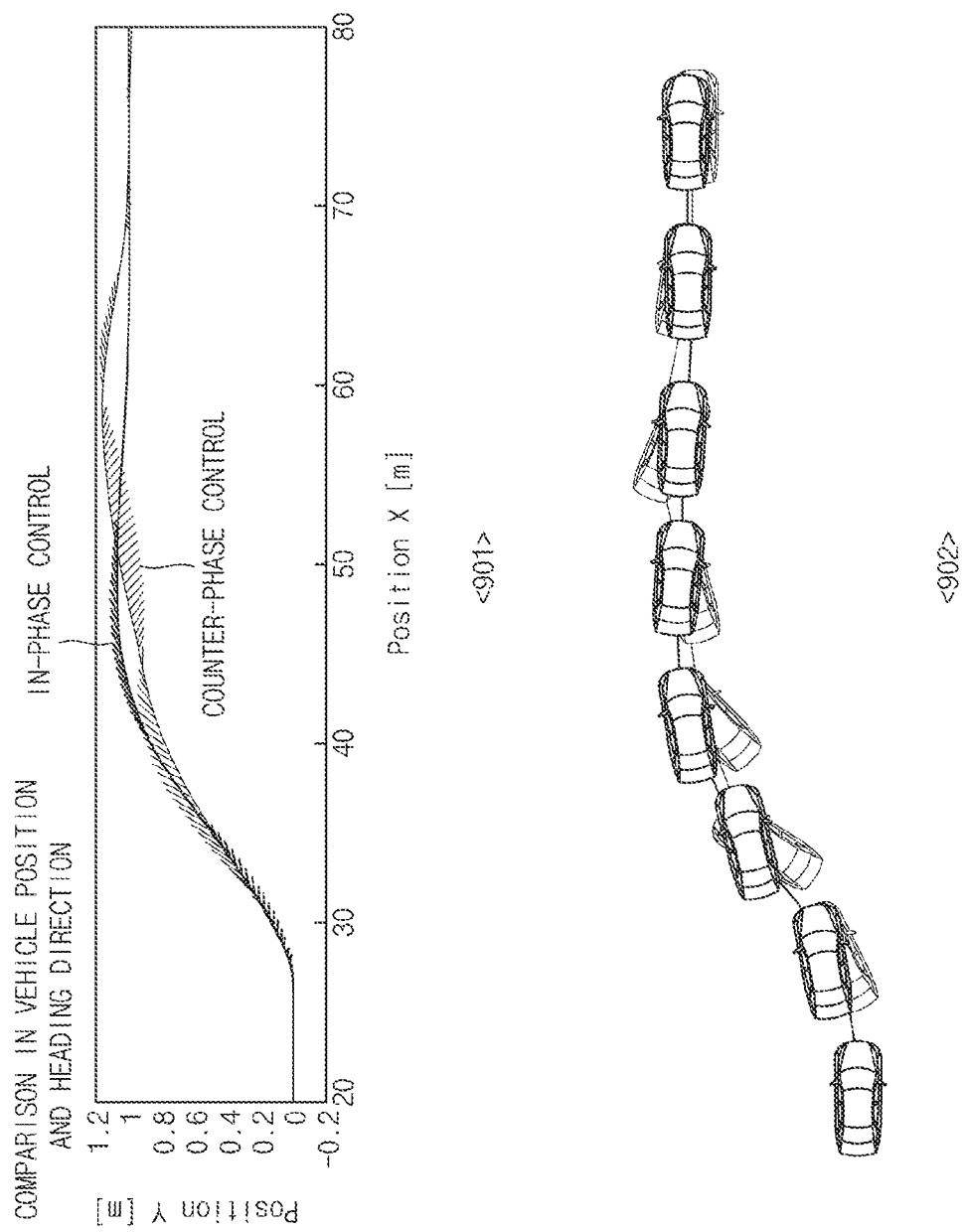
FIG. 9 is a graph illustrating the comparison between the RWS in-phase control and the counter-phase control, according to an embodiment of the present disclosure.

FIG. 9 is a graph illustrating the comparison between the RWS in-phase control and the counter-phase control according to an embodiment of the present disclosure. Reference numeral 901 illustrates the comparison between the in-phase control of RWS with the counter-phase control of the RWS, when a 80 Kph transverse distance is moved by 1 m. Referring to reference numeral 902, when the counter-phase control is performed, the heading angle is sharply changed and the change in the actual transverse position is not great.

Figure 10:
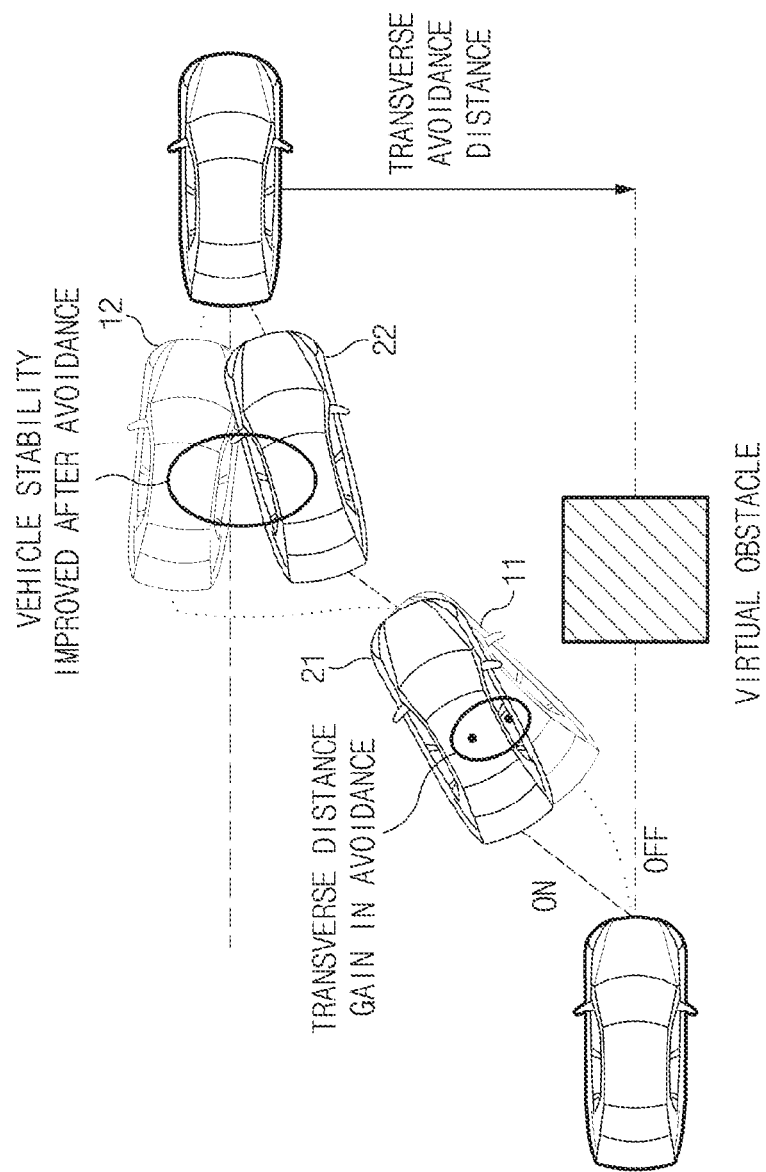
FIG. 10 is a view illustrating that avoidance steering assistance control is performed by ensuring a transverse distance, according to an embodiment of the present disclosure.

FIG. 10 is a view illustrating that avoidance steering assistance control is performed by ensuring a transverse distance, according to an embodiment of the present disclosure.

Referring to FIG. 10, the heading angle and the traveling path of the vehicles 21 and 22 according to avoidance steering assistance based on the RWS control amount are compared with the heading angle and the traveling path of the vehicles 11 and 12 according to conventional avoidance steering assistance.

The change in the heading angle of the vehicles 21 and 22 according to avoidance steering assistance based on the RWS control amount is greater than the change in the heading angle of the vehicles 11 and 12 according to the conventional avoidance steering assistance. However, the transverse distance gains of the vehicles 21 and 22 may be generated in the avoidance steering assistance based on the RWS control amount, such that the avoidance assistance may be more stably performed.

Figure 11:
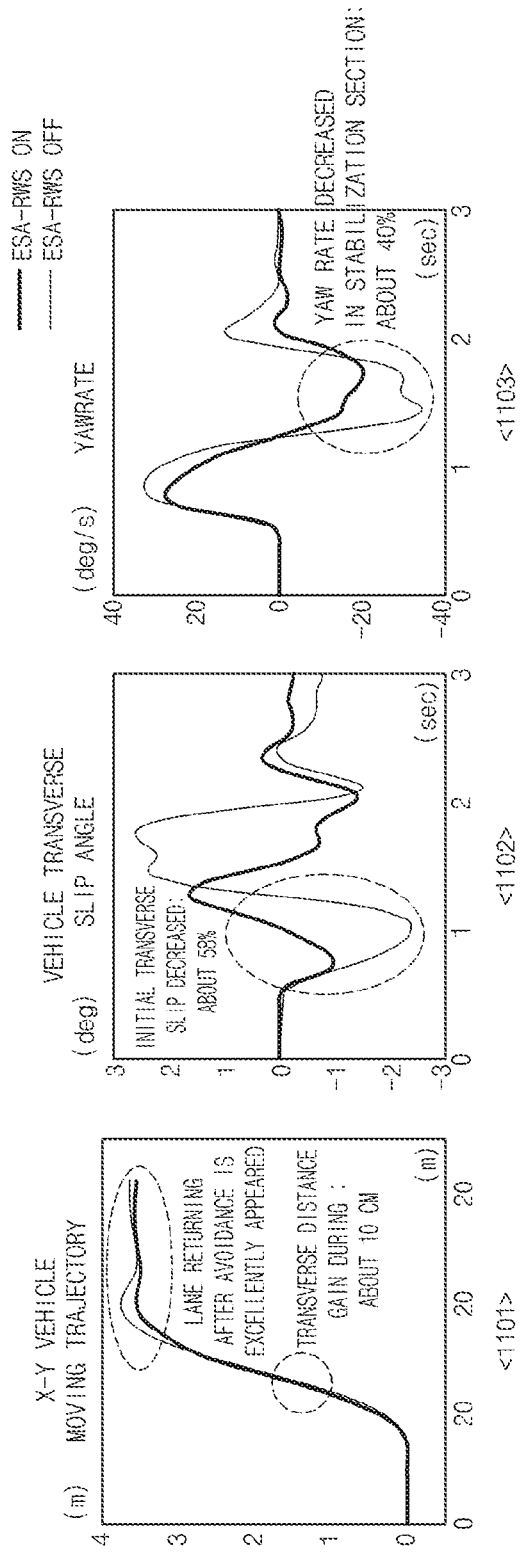
FIG. 11 is a graph illustrating an avoidance steering control result, according to an embodiment of the present disclosure.

FIG. 11 is a graph illustrating an avoidance steering control result, according to an embodiment of the present disclosure.

Reference numeral 1101 of FIG. 11 illustrates an X-Y vehicle moving trajectory in the conventional control and the RWS control based on the transverse distance gain. The X-Y vehicle moving trajectory is illustrated in the RWS control based on the transverse distance. In this case, it may be recognized that the transverse distance gain is made by 10 cm during avoidance and the vehicle may be more excellently returned to the lane after avoidance, when compared to the conventional control.

Reference numeral 1102 illustrates the change in the transverse slip angle of the vehicle in the conventional control and the RWS control based on the transverse distance. The difference in the initial transverse slip between the conventional control and the RWS control based on the transverse distance is illustrated. In other words, when compared to the conventional control, the initial transverse slip is reduced in the RWS control based on the transverse distance.

Reference numeral 1103 illustrates the change in the yaw rate of the vehicle in the conventional control and the RWS control based on the transverse distance. The difference in the yaw rate between the conventional control and the RWS control based on the transverse distance is illustrated. In other words, when compared to the conventional control, the yaw rate of the vehicle is reduced in the RWS control based on the transverse distance.

Figure 12:
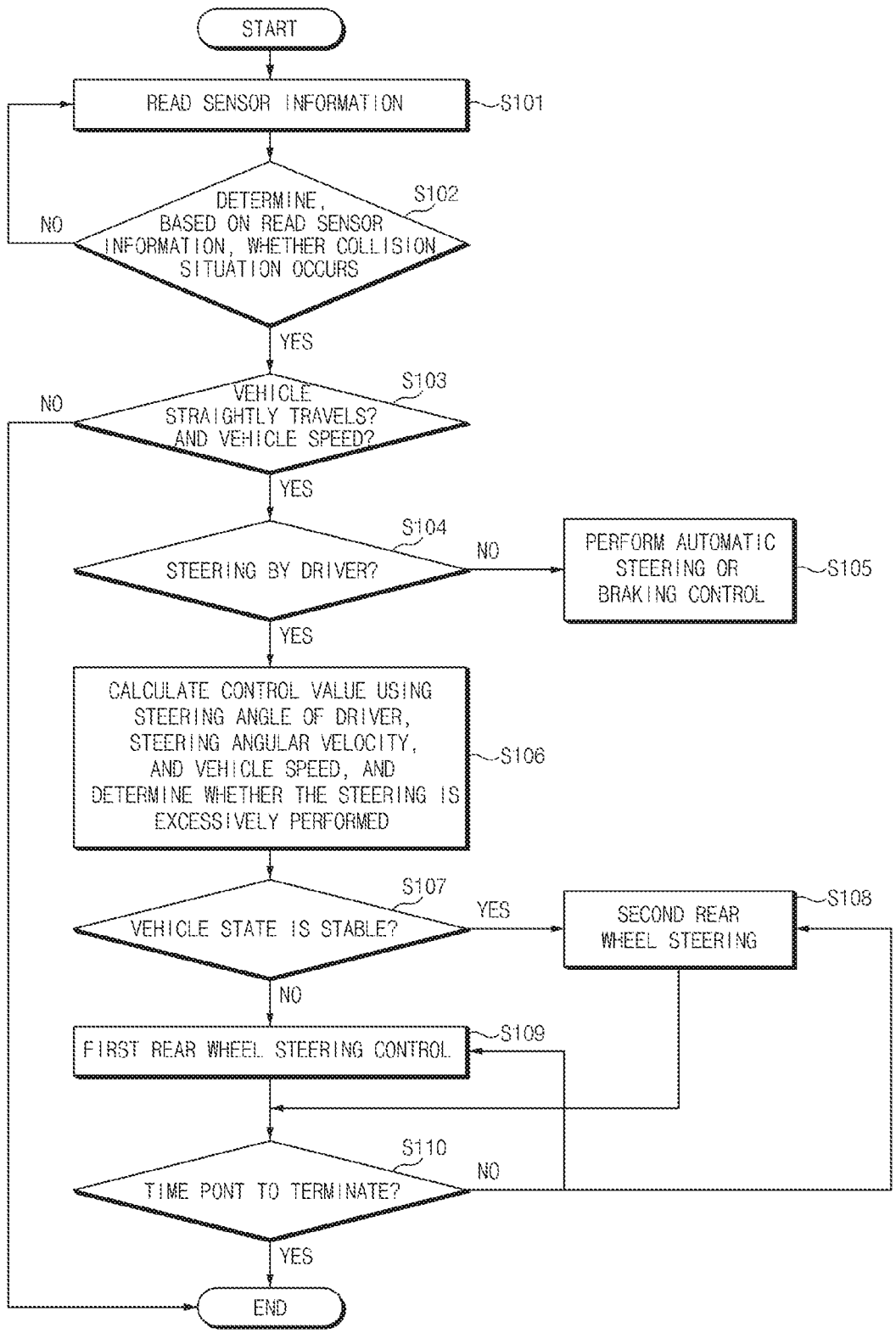
FIG. 12 is a flowchart illustrating a method for assistance avoidance steering, according to an embodiment of the present disclosure.

Hereinafter, a method for assistance avoidance steering will be described with reference to FIG. 12. FIG. 12 is a flowchart illustrating a method for assistance avoidance steering according to an embodiment of the present disclosure.

Hereinafter, it is assumed that the avoidance steering assistance apparatus 100 of FIG. 1 is performed by the process of FIG. 12. In addition, in the description made with reference to FIG. 12, it may be understood that operations described as being performed by the avoidance steering assistance apparatus 100 may be controlled by the processor 130 of the avoidance steering assistance apparatus 100.

Referring to FIG. 12, the avoidance steering assistance apparatus 100 starts reading sensor information during vehicle driving after starting the engine of the vehicle (S101). In this case, the sensor information may include information received from the vehicle exterior information sensing device 200 and the vehicle interior information sensing device 300 and information received from the external situation recognizing device 400. In this case, the avoidance steering assistance apparatus 100 may obtain information on an obstacle based on the read sensor information.

The avoidance steering assistance apparatus 100 determines, based on the read sensor information, whether a collision situation occurs (S102). In other words, the avoidance steering assistance apparatus 100 may determine whether the collision situation occurs by calculating the collision time TIC with an object.

When it is expected that the vehicle will collide with the object, an emergency flag is generated, and the avoidance steering assistance apparatus 100 determines whether the vehicle is controllable by determining the motion situation of the vehicle, that is, determining whether the vehicle straightly travels and the vehicle speed (S103).

When the vehicle is controllable (YES), the avoidance steering assistance apparatus 100 determines the steering state of the driver (S104). When the driver does not perform the steering (NO), the avoidance steering assistance apparatus 100 performs the automatic steering or the braking control of the vehicle by taking into consideration the expected collision situation (S105).

When it is determined that the steering is performed by the driver (YES), the avoidance steering assistance apparatus 100 calculates a control value using the steering angle of the driver, the steering angular velocity, and the vehicle speed, and determines whether the steering is excessively performed (S106).

The avoidance steering assistance apparatus 100 determines whether the vehicle state is in the stable state, depending on whether the steering is excessively performed (S107). The avoidance steering assistance apparatus 100 may determine the stabilization state of the vehicle by estimating the slip angle and the tire slip angle of the vehicle based on the steering angle of the vehicle, the longitudinal/transverse gravitational acceleration (G) of the vehicle speed, and the yaw rate.

When the vehicle state is the stable state (YES), the avoidance steering assistance apparatus 100 performs second RWS control (S108). In this case, the second RWS control, which does not requires RWS control for the stabilization of the vehicle state, does not additionally control the RSW.

When the vehicle state is in the instable state (NO), the avoidance steering assistance apparatus 100 performs first RWS control (S109). In this case, the first RWS control is to increase or decrease the RWS control amount to stabilize the vehicle state.

Regarding the detailed description of the first RWS control and the second RWS control, as illustrated in FIG. 3A, the target transverse distance is determined based on the relative speed to the front vehicle and the relative distance to the front vehicle, and the RWS control amount is calculated corresponding to the target transverse distance.

Thereafter, as illustrated in FIG. 6, the RWS control amount may be increased or decreased depending on the size of the steering angle of the driver. In other words, when the size of the steering angle of the driver is smaller, the RWS control amount is increased, and when the size of the steering angle of the driver is greater, the RWS control amount may be minimized, thereby minimizing the sense of the difference. The above description has been made regarding the second RWS control.

However, the control for the stabilization of the vehicle may be additionally required according to the determination result of the stabilization result of the vehicle. As illustrated in FIG. 8, when the rear wheel transverse slip angle becomes greater than a preset transverse slip angle, the stabilization control mode may be turned on, and the RWS control amount may be increased in the stabilization control. As described above, the first RWS control is to control the additional variation in the RWS control amount for the stabilization state of the vehicle. In other words, the first RWS control is to additionally increase or decrease the second RWS control by the RWS control amount depending on the rear wheel transverse slip angle.

The avoidance steering assistance apparatus 100 determines whether it is a time point to terminate avoidance steering assistance control (the time point to complete the avoidance or the time point to terminate the collision situation) (S110). When it is a time point to terminate avoidance steering assistance control (YES), the avoidance steering assistance apparatus 100 terminates the avoidance steering assistance control. When it is not the time point to terminate the avoidance steering assistance control (NO), the avoidance steering assistance apparatus 100 performs the second RWS (S108).

As described above, according to an embodiment of the present disclosure, the avoidance steering assistance apparatus 100 determines an emergency state of collision with a pedestrian or an obstacle in front of the vehicle, and starts the avoidance steering control when a collision is expected (avoidance section).

The avoidance steering assistance apparatus 100 may calculate the RWS control amount using the vehicle speed and the steering angle speed of the vehicle, perform RWS control to ensure the maximum transverse distance, and vary the RWS control amount depending on the steering of the driver or the vehicle stabilization state.

Therefore, embodiments of the present disclosure establish an RWS control strategy by sensing the head-on collision risk and by taking into consideration the vehicle speed, the steering angle, and the steering angle speed in the avoidance steering by the driver, maximizes the avoidance performance using the RWS, and ensures the stability of the vehicle. In addition, according to embodiments of the present disclosure, the integral control is possible together with other autonomous driving control devices such as other ADAS (advanced driver assistance systems).

Figure 13:
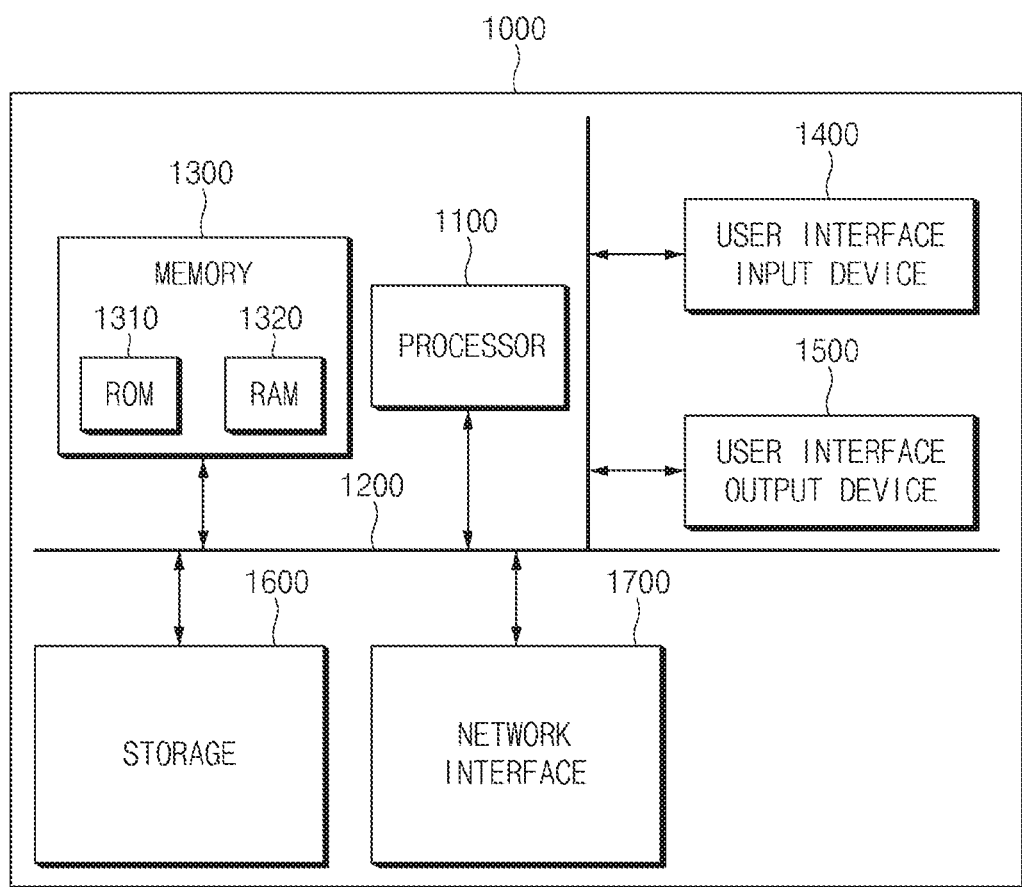
FIG. 13 illustrates a computing system, according to an embodiment of the present disclosure.

FIG. 13 illustrates a computing system, according to an embodiment of the present disclosure.

Referring to FIG. 13, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only memory (ROM) and a random access memory (RAM).

Thus, the operations of the methods or algorithms described in connection with the embodiments disclosed in the present disclosure may be directly implemented with a hardware module, a software module, or the combinations thereof, executed by the processor 1100. The software module may reside on a storage medium (i.e., the memory 1300 and/or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM).

The exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as separate components of the user terminal.

According to embodiments of the present disclosure, the performance of the avoidance of a head-on collision of the vehicle and the stability of the vehicle may be improved by ensuring the maximum transverse distance through Rear Wheel Steering when a driver performs avoidance steering to avoid the head-on collision in the situation that the head-on collision is sensed.

According to embodiments of the present disclosure, the RWS control amount may be changed depending on the steering angle of the driver.

In addition, according to embodiments of the present disclosure, the stable state of a vehicle may be determined by estimating the transverse slip angle of a rear wheel tire and the RWS control amount may be varied in a stable control mode.

In addition, a variety of effects directly or indirectly understood through the disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, embodiments of the present disclosure are not intended to limit the technical spirit of the present disclosure, but provided only for the illustrative purpose. The scope of protection of the present disclosure should be construed by the attached claims, and all equivalents thereof should be construed as being included within the scope of the present disclosure.

What is claimed is:

1. An apparatus for assistance avoidance steering, the apparatus comprising:
   a processor configured to perform avoidance steering control based on Rear Wheel Steering (RWS) control when a head-on collision risk is sensed by generating a transverse distance gain by moving a rotation center to a rear portion from the center of gravity of a vehicle when the vehicle is turned for the avoidance steering control; and a storage configured to store data and an algorithm runnable by the processor, the avoidance steering control being based on the algorithm, wherein the processor is configured to:
determine a target transverse distance in the avoidance steering control based on a relative distance to a front vehicle and a relative speed to the front vehicle; and
determine a movement distance of the rotation center based on the target transverse distance.

2. The apparatus of claim 1, wherein the processor is configured to calculate an RWS control amount for the RWS control to ensure a transverse distance in the avoidance steering control.

3. The apparatus of claim 2, wherein the processor is configured to calculate the RWS control amount based on a vehicle speed, a driver steering angle, and a steering angular velocity.

4. The apparatus of claim 2, wherein the processor is configured to vary the RWS control amount depending on a driver steering angle.

5. The apparatus of claim 4, wherein the processor is configured to:
increase the RWS control amount when the driver steering angle is smaller than a preset reference value; and
decrease the RWS control amount when the driver steering angle is equal to or greater than the preset reference value.

6. The apparatus of claim 2, wherein the processor is configured to process counter-phase control at an initial stage of turning of a vehicle and in-phase control during the turning of the vehicle in the RWS control to increase the transverse distance.

7. The apparatus of claim 2, wherein the processor is configured to perform automatic steering or braking control when steering control by a driver is absent.

8. The apparatus of claim 2, wherein the processor is configured to determine a stabilization state of a vehicle by estimating a transverse slip angle of a rear wheel of the vehicle.

9. The apparatus of claim 8, wherein the processor is configured to enter a stabilization control mode when the estimated transverse slip angle of the rear wheel of the vehicle exceeds a preset threshold value.

10. The apparatus of claim 9, wherein the processor is configured to vary the RWS control amount in the stabilization control mode.

11. A vehicle system comprising:
an avoidance steering assistance apparatus configured to perform avoidance steering control based on Rear Wheel Steering (RWS) control when a head-on collision risk is sensed by generating a transverse distance gain by moving a rotation center to a rear portion from the center of gravity of a vehicle, when the vehicle is turned for the avoidance steering control; and
a rear wheel steering driving device configured to be controlled by the avoidance steering assistance apparatus to drive RWS of a vehicle,
wherein the avoidance steering assistance apparatus is configured to:
determine a target transverse distance in the avoidance steering control based on a relative distance to a front vehicle and a relative speed to the front vehicle; and
determine a movement distance of the rotation center based on the target transverse distance.

12. The vehicle system of claim 11, further comprising:
a vehicle exterior information sensing device configured to obtain information on an obstacle outside the vehicle;
a vehicle interior information sensing device configured to obtain internal information of the vehicle; and
an external situation recognizing device configured to recognize a determination result of a collision risk outside the vehicle.

13. The vehicle system of claim 11, wherein the avoidance steering assistance apparatus is configured to calculate an RWS control amount for the RWS control to ensure a transverse distance in the avoidance steering control.

14. A method for assistance avoidance steering, the method comprising:
sensing a head-on collision risk;
calculating Rear Wheel Steering (RWS) control amount to perform avoidance steering control for the head-on collision risk, the RWS control amount calculated by generating a transverse distance gain by moving a rotation center to a rear portion from the center of gravity of a vehicle, when the vehicle is turned for the avoidance steering control; and
performing the avoidance steering control based on the RWS control amount,
wherein the calculating of the RWS control amount comprises:
determining a target transverse distance in the avoidance steering control based on a relative distance to a front vehicle and a relative speed to the front vehicle; and
determining a movement distance of the rotation center based on the target transverse distance.

15. The method of claim 14, wherein calculating the RWS control amount further comprises calculating the RWS control amount based on a vehicle speed, a driver steering angle, and a steering angular velocity.

16. The method of claim 14, wherein calculating the RWS control amount further comprises varying the RWS control amount depending on a steering angle of a driver.

17. The method of claim 14, wherein calculating the RWS control amount further comprises:
determining a stabilization state of a vehicle by estimating a transverse slip angle of a rear wheel of the vehicle; and
varying the RWS control amount depending on the stabilization state of the vehicle.

18. The method of claim 17, wherein the RWS control amount is calculated based on a vehicle speed, a driver steering angle, and a steering angular velocity.

19. The method of claim 17, wherein calculating the RWS control amount further comprises:
varying the RWS control amount depending on a driver steering angle.

20. The method of claim 19, wherein calculating the RWS control amount further comprises:
increasing the RWS control amount when the driver steering angle is smaller than a preset reference value; and
decreasing the RWS control amount when the driver steering angle is equal to or greater than the preset reference value.

\* \* \* \* \*